United States Patent Office 3,660,439
Patented May 2, 1972

3,660,439
CATALYTIC PREPARATION OF CARBOXYLIC ACID ESTERS FROM OLEFINS, ALCOHOLS AND CARBON MONOXIDE IN THE PRESENCE OF KETONE PROMOTER
Raymond A. Schell, Berkley, Mich., assignor to Ethyl Corporation, New York, N.Y.
No Drawing. Continuation-in-part of application Ser. No. 671,110, Sept. 27, 1967. This application Mar. 20, 1970, Ser. No. 21,471
Int. Cl. C07c *51/14, 67/00*
U.S. Cl. 260—410.9 R        30 Claims

ABSTRACT OF THE DISCLOSURE

A process is described for preparing carboxylic acid esters from olefins, alcohols and carbon monoxide using a combination of tin or germanium salt and a platinum salt as the catalyst and a ketone promoter.

Olefins having from 8 to about 24 carbon atoms are preferred reactants. Alkyl ketones having up to 11 carbon atoms are useful promoters.

The reaction rate is unexpectedly improved by the promoter.

CROSS REFERENCE TO RELATED APPLICATION

This application is a continuation-in-part of Ser. No. 671,110, filed Sept. 27, 1967, now abandoned.

BACKGROUND OF THE INVENTION

This invention is directed to an improved process for preparing carboxylic acid esters from olefins, carbon monoxide and alcohols.

The reaction of primary alcohols with olefins and carbon monoxide to produce esters is well known. There are a number of U.S. patents describing the use of various catalysts for this reaction, see for example, U.S. 2,542,767, U.S. 2,526,742, U.S. 2,557,256. An especially useful catalyst system is described in U.S. 2,876,254. The process therein described is directed to the reaction of olefins having up to six carbon atoms with carbon monoxide and an alcohol using as a catalyst a combination of a tin or germanium salt with a Group VIII metal salt. When higher molecular weight olefins such as dodecene are used in this process, the yield of ester product is low and the rate of reaction is poor.

It has been discovered that the rate of carboxylating higher molecular weight olefins using a catalyst of U.S. 2,876,254 is significantly increased by carrying the reaction out in the presence of ketones as promoters.

SUMMARY OF THE INVENTION

A process for preparing carboxylic acid esters which comprise reacting an olefin having from about 2 to about 32 carbon atoms with carbon monoxide and an alcohol using a catalyst which is a combination of a salt of tin or germanium and a platinum salt and an alkyl ketone.

DESCRIPTION OF THE PREFERRED EMBODIMENTS

An embodiment of this invention is a process for preparing carboxylic acid esters which comprises reacting a $C_2$–$C_{32}$ olefin characterized by (1) having at least one α-carbon-to-carbon double bond and (2) having a hydrogen on the 2 carbon atom of said α double bond with carbon monoxide and a $C_1$–$C_{24}$ alcohol in the presence of a catalyst which is a combination of an alcohol soluble salt of a metal selected from the class consisting of tin and germanium and a platinum salt and an alkyl ketone promoter. A preferred embodiment is the process described above in which the catalyst is a combination of (a) a tin or germanium halide with a platinum halide or (b) a tin or germanium halide with an alkali metal haloplatinum salt or (c) stannous chloride dihydrate and potassium hexachloroplatinate ($K_2PtCl_6$). $C_1$–$C_{10}$ monohydroxy alkanols are preferred reactant alcohols. Alpha monoolefins are preferred olefins. Dialkyl ketones having up to about 11 carbon atoms are preferred as promoters. A most preferred process is the catalytic process described above wherein methanol is the reactant alcohol and acetone is the promoter.

Organic compounds which are useful reactants in the practice of this invention are olefins (1) having at least one alpha carbon-to-carbon double bond and (2) a hydrogen atom on the 2 carbon atom of said α double bond. These olefins include mono unsaturates, that is, compounds having one α carbon-to-carbon double bond as well as polyunsaturates, that is, compounds having two or more carbon-to-carbon double bonds. Useful olefins may contain other functional groups such as hydroxy, halo, carboxy, nitro and the like. Examples of useful unsaturated organic compounds are 3-chlorooctene-1, 9-hydroxytetradecene-1, and the like. Preferred olefins are the hydrocarbon olefins. Examples of preferred olefins are octene-1, pentadecene-1, tetraisobutylene, cyclooctene, cyclooctadiene-1,5, dodecene-1, eicosene-1, nonene-1, octadecene-5 and the like. Most preferred olefins are the acyclic α olefins. Examples of preferred olefins are tetracosene-1, octadecadiene-1,3, undecadiene-1,4, and the like. Especially preferred hydrocarbon olefins are the α-monoolefins, that is, hydrocarbons having only one carbon-to-carbon double bond in the 1,2 position in the molecule. Examples of suitable α-monoolefins are ethylene, 4-methylpentene-1, butene-1, 3-methylbutene-1, octene-1, nonene-1, decene-1, tetradecene-1, dodecene-1, 5-ethylhexene-1, pentadecene-1, heptadecene-1, eicosene-1, and the like.

Commercial mixtures of olefins are also quite useful. These commercial mixtures are generally a mixture of various homologous olefins such as $C_4$, $C_6$, $C_8$ olefins; $C_5$, $C_7$, $C_9$, $C_{11}$ olefins; $C_{12}$, $C_{14}$, $C_{16}$ olefins; $C_{12}$, $C_{14}$ olefins; $C_{13}$, $C_{15}$, $C_{17}$ olefins; $C_{11}$, $C_{12}$, $C_{13}$, $C_{14}$, $C_{15}$ olefins; $C_{18}$, $C_{20}$, $C_{22}$ olefins; $C_{14}$, $C_{15}$ olefins; $C_{12}$, $C_{14}$, $C_{16}$, $C_{18}$, $C_{20}$, $C_{22}$, $C_{24}$, $C_{26}$, $C_{28}$ olefins, and the like. These mixed olefins are synthesized for example by the Ziegler catalyzed polymerization of low molecular weight olefins such as ethylene or propylene; or by the dehydrogenation of suitable paraffins. The mixed olefins thus obtained might also contain minor amounts of other non-homologous olefins and non-olefin components. In any case, the mixed product obtained from such a commercial synthesis need not be separated into the individual components to be useful. Mixtures of even carbon numbered predominantly α olefins in the $C_8$–$C_{32}$ range having an average molecular weight of $C_{12}$–$C_{14}$ are useful; $C_{10}$–$C_{28}$ range mixtures are particularly useful. Such mixtures containing $C_8$ to $C_{24}$ predominantly α-olefins are especially useful. By predominantly I mean that over 60% of the olefins are alpha.

Alcohols which are useful reactants include both aryl as well as alkyl hydroxy compounds. Examples of suitable aryl hydroxy compounds are benzyl alcohol, phenol, $C_1$ to $C_{18}$ alkyl phenols, and the like. The preferred alcohols are the alkyl hydroxy compounds having from 1 to about 10 carbon atoms wherein the alkyl group is composed solely of carbon and hydrogen. The term hydrocarbyl alkanols is used to describe these preferred alcohols. These hydrocarbyl alkanols include cyclic alcohols such as cyclohexanol, cyclopentanol and the like, as well as primary, secondary and tertiary alcohols such as 2-decanol, tert-butanol, 2-ethylhexanol-1 and the like. The most preferred alcohols are the acyclic hydrocarbyl monohydroxy primary alkanols having from 1 to about 5 carbon atoms such as ethanol, pentanol-1, butanol and the like. Methanol is an especially preferred alcohol.

The catalysts which are used in effecting the reaction are in general a combination of alcohol soluble salts of tin or germanium with platinum salts. Preferred salts are the halides wherein the halogen has an atomic number of at least 17. The chlorides are especially preferred. Specific examples of suitable salts of tin and germanium are stannous and stannic chlorides, bromides and iodides, germanium di- and tetrachlorides and germanium tetrabromides, tetraiodides and tetrafluorides, stannous and stannic sulfates and the like and their hydrates. Stannous chloride is preferred either anhydrous or hydrated.

Examples of suitable platinum salts are platinic iodide, platinic bromide, platinic chloride, platinous iodide, platinous chloride, platinous bromide, platinic sulfate, platinous phosphate, platinic nitrate and the like. Preferred platinum salts are the alkali metal salts of haloplatinum acids such as $Na_2PtBr_4$, $Li_2PtI_6$, $K_2PtBr_6$, $K_2PtI_4$, $Na_2PtBr_4$ and the like. Alkali metal salts of chloroplatinum and chloroplatinous acid are more preferred, e.g., $K_2PtCl_4$, $Na_2PtCl_6$, $Li_2PtCl_6$, $K_2PtCl_4$, $Na_2PtCl_4$, $Li_2PtCl_4$.

Especially useful catalyst combinations are $$SnCl_2 \cdot 2H_2O$$

with $K_2PtCl_6$; and $SnCl_2$ with $K_2PtCl_6$.

Special preparation of the catalysts does not appear to be required. In general, as set out in U.S. 2,876,254, the suitable metal salts may be dissolved directly in the alcohol reactant which is being used in the carboxylation. Molar ratios of tin or germanium salt to Group VIII noble metal salt of from 1:1 to 20:1 can be used in the preparation of the catalysts. The amount of catalyst which can be employed can be varied widely, but is generally about 0.0001 to about 0.2 mole of contained platinum metal per mole of reactant alcohol charged into the reactor.

The promoters which increase the rate of the carboxylation reaction are generally organic compounds of the ketone or ether class. Typical promoters are the alkyl ketones having up to about 11 carbon atoms such as diisobutyl ketone, cyclohexanone, methylethyl ketone, methyl isobutyl ketone, diamyl ketone, cyclohexyl ethyl ketone and the like; and alkyl ethers having from 4 to about 16 carbon atoms such as morpholine, diethyl ether, 1,4-dioxane, di-n-butylether, di-n-hexylether, di - 2 - ethylhexyl ether, $C_1$–$C_4$ dialkyl glycol ethers and polyethers such as 1,2-diethoxy ethane, bis[2(2-methoxyethoxy)ethyl]ether, bis(2-butoxy ethyl)ether, 1,2-di-propoxy propane and the like. Mixtures of the promoter compounds can also be used.

Especially preferred promoters are acetone and 1,2-dimethoxy ethane.

As will be illustrated below these promoters unexpectedly improve the rate of the catalytic carboxylation of $C_8$ and higher olefins to produce esters.

The amount of promoter used ranges from about 10 percent to about 70 percent by weight of the total alcohol/olefin charge. Generally, 20 percent to about 60 percent by weight of the promoter can be used.

The action of the promoter is not fully understood. Although not bound by any theory, it is thought that the promoter may function as a complexing agent. Whatever the mechanism, the presence of the promoter unexpectedly improves the overall rate of the carboxylation reaction.

Water is not required in the present process. In other words, the reaction to produce esters will proceed with essentially no water present. However, water need not be excluded from the present process; and, in fact, the process can be carried out in the presence of up to moderate amounts of water. Thus, for example, the reaction to produce esters will proceed when the catalyst components bear water of hydration (e.g. $SnCl_2 \cdot 2H_2O$) or when the alcohol reactant is not anhydrous and the like. Excess amounts of water, that is, over about 1.7 moles of water per mole of olefin reactant, should be avoided.

The temperature at which the reaction is carried out may vary over a wide range. In general, temperatures in excess of about 30° C. are used. The temperature range of from about 30° C. to about 325° C. may be employed. Temperatures from about 50° to about 275° C. are conveniently used. Temperatures ranging from about 70° C. to about 120° C. are preferred. The process may be carried out under pressure ranging from 500 to about 10,000 pounds per square inch (p.s.i.). Reaction pressures of from about 750 to about 5,000 p.s.i. are conveniently used.

The product obtained in the present carboxylation process is a mixture of ester isomers. This is illustrated by the following reaction equation:

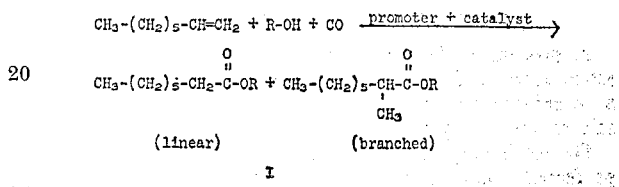

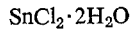

The product obtained thus, is a mixture of linear and branched esters. The major product obtained in the present process is the linear ester. By major product I mean more than about 60 percent by weight of the ester mixture is the linear ester.

This mixture of ester isomers may be separated if desired by any suitable separation methods such as by fractional distillation, by selective absorption, and the like. The mixture of esters may likewise be used as such without any separation of isomers.

As the examples which follow will show, by using the promoter, the rate of the carboxylation reaction is increased substantially. In the following examples all parts are by weight unless otherwise specified.

EXAMPLE 1

No promoter

A suitably sized autoclave was charged with 19.2 parts of hexene-1, 24.4 parts of methanol, 0.8 part of $K_2PtCl_6$ and 2.3 parts of $SnCl_2 \cdot 2H_2O$. Carbon monoxide was introduced into the autoclave to a pressure of 2,000 p.s.i. The reaction mass was heated to 90° C. with stirring. The carbon monoxide was then added to a total pressure of 3,000 p.s.i. The reaction was continued at this temperature for 12 hours. During this time a total pressure drop of 450 p.s.i. was recorded. The reaction mass was cooled to room temperature and the autoclave was vented; 47.8 parts of liquid product was obtained. Analysis of the product by vapor phase chromatography showed that olefin conversion was 59 percent and the yield of methyl heptanoates based on this conversion was 85 percent, of which 82 percent was the linear ester.

EXAMPLE 2

With promoter

A suitably sized autoclave was charged with 14.5 parts of dodecene-1, 17.2 parts of methanol, 24.4 parts of acetone, 1 part of $K_2PtCl_6$ and 2.3 parts of $SnCl_2 \cdot 2H_2O$. Carbon monoxide was introduced to a pressure of 2,000 p.s.i. The reaction mass was heated to 90° C. and CO was introduced to a total pressure of 3,000 p.s.i. The reaction was continued at this temperature for 1 hour, a pressure drop of 500 p.s.i. being recorded. The reaction mass was cooled to room temperature and the autoclave was vented; 59.6 parts of a liquid product was obtained. Analysis of this product by vapor phase chromatography showed that the conversion of olefin was 81 percent and the yield of methyltridecanoates based on the conversion was 92 percent, of which 81 percent was the linear ester.

EXAMPLE 3

With promoter

A suitably sized autoclave was charged with 15.1 parts of dodecene-1, 17.4 parts of methanol, 21.4 parts of 4-methyl-2-pentanone, 1 part of $K_2PtCl_6$ and 2.3 parts of the $SnCl_2 \cdot 2H_2O$. Carbon monoxide was introduced to a pressure of 2,000 p.s.i. The reaction mass was heated to 90° C. and carbon monoxide was added to a total pressure of 3,000 p.s.i. The reaction was continued for one hour. A pressure drop of 350 p.s.i. was recorded. The reaction mass was cooled to room temperature and the autoclave was vented; 59.1 parts of liquid product was obtained. Analysis of the product by vapor phase chromatography showed that olefin conversion was 73 percent, and a yield of methyl tridecanoates based on this conversion was 86 percent, of which 82 percent was the linear ester.

The improvement in rate of reaction is clearly illustrated by the examples set out above. Example 1 shows that the reaction of an α-olefin (hexene-1) with CO and methanol in the presence of the mixed tin/platinum catalyst at 90° C. resulted in only a 59 percent conversion of α-olefin after 12 hours. By percent conversion, I mean that percent of the total charge which reacted with the CO and alcohol. In other words, only 59 percent of the hexene-1 reacted in 12 hours at 90° C. Using a similar olefin (dodecene-1) and the same catalyst system as in Example 1, but adding acetone as a promoter, the conversion of α-olefin at 90° C. after only one hour was 81 percent (Example 2); and running essentially the same reaction as in Example 2, but using 4-methyl-2-pentanone as the promoter, the conversion of α-olefin was 73 percent (Example 3). It is evident that the use of a ketone promoter in the process of Example 1 significantly increases the olefin conversion and substantially reduces required reaction time. Thus, using the promoter system of the present invention, the rate of carboxylation of olefins to produce esters is substantially increased.

The following series of examples further illustrates the process of the present invention. The abbreviation mmoles as used herein means millimoles.

EXAMPLE 4

A suitably sized autoclave was charged with 89 mmoles of dodecene-1, 494 mmoles of methanol, about 24 grams of acetone, 1.0 gram of $K_2PtCl_6$ (anhydrous), and 1.9 grams of $SnCl_2$ (anhydrous). Carbon monoxide was added to a pressure of 2730 p.s.i. The reaction mixture was heated to 92° C. and the pressure was adjusted with CO to 3250 p.s.i. The reaction was continued at this temperature for 1 hour during which a pressure drop of 250 p.s.i. was observed. The reaction mass was then cooled to room temperature and the autoclave was vented. 57.5 grams of liquid product were obtained. Analysis of the product by vapor phase chromatography showed that conversion of olefin was 58 percent. The yield of methyl tridecanoates was 88 percent, of which 85 percent was the linear ester.

This example also illustrates that the reaction of the present promoted process will proceed satisfactorily even though the reactants and catalyst are substantially free of water. In other words, addition of even small amounts, e.g. catalyst water of hydration, to the reaction mixture is not required in the present process.

EXAMPLE 5

A suitably sized autoclave was charged with 95 mmoles of dodecene-1, about 16.8 grams of methanol, about 28.8 grams of acetone, 1.67 grams of $PtCl_4$, and 2.3 grams of $SnCl_2 \cdot 2H_2O$. Carbon monoxide was added to a pressure of 2700 p.s.i. The reaction mixture was heated to 90° C. and the pressure was adjusted with CO to 2950 p.s.i. The reaction was continued at this temperature for 6 hours during which a pressure drop of 550 p.s.i. was observed. The reaction mass was then cooled to room temperature and the autoclave was vented. 66.3 grams of liquid product were obtained. Analysis of the product by vapor phase chromatography showed that conversion of olefin was 80 percent. The yield of methyl tridecanoates was 94 percent, of which 83 percent was the linear ester.

Analogous results are obtained in the above example when propylene is used to prepare methylbutyrates; when mixtures of even carbon numbered α-olefins ranging from $C_8$-$C_{32}$ to prepare methyl esters of carboxylic acids having one carbon atom more than the starting olefin mixture; when the reaction is carried out at 50° C., 120° C., or 150° C.; when $PtBr_4$ is used as the platinum component of the catalyst; when $GeBr_4$ or $GeCl_2$ is used in place of $SnCl_2 \cdot 2H_2O$.

A suitably sized autoclave was charged with 228 mmoles of dodecene-1, about 40 grams of methanol, about 60 grams of acetone, 0.54 gram of $PtCl_2$, and 2.3 grams of $SnCl_2 \cdot 2H_2O$. Carbon monoxide was added to a pressure of 2000 p.s.i. The reaction mixture was heated to 90° C. and the pressure was adjusted with CO to 3000 p.s.i. The reaction was continued at this temperature for 6 hours during which a pressure drop of 200 p.s.i. was observed. The reaction mass was then cooled to room temperature and the autoclave was vented. 137.6 grams of liquid product were obtained. Analysis of the product by vapor phase chromatography showed that conversion of olefin was 24 percent. The yield of methyl tridecanoates was approximately 100 percent, of which 91 percent was the linear ester.

When an equivalent amount of ethanol, sec-butanol, n-nonanal or phenol is used in place of the methanol in Example 6, analogous yields of the ethyl, sec-butyl, nonyl, and phenyl tridecanoate esters, respectively, are obtained.

EXAMPLE 7

A suitably sized autoclave was charged with 226 mmoles of dodecene-1, about 40 grams of methanol, about 60 grams of acetone, 0.83 gram of $K_2PtCl_4$ and 2.3 grams of $SnCl_2 \cdot 2H_2O$. Carbon monoxide was added to a pressure of 2000 p.s.i. The reaction mixture was heated to 90° C. and the pressure was adjusted with CO to 3000 p.s.i. The reaction was continued at this temperature for 4.5 hours during which a pressure drop of 100 p.s.i. was observed. The reaction mass was then cooled to room temperature and the autoclave was vented. 135.6 grams of liquid product were obtained. Analysis of the product by vapor phase chromatography showed that conversion of olefin was 54 percent. The yield of methyl tridecanoates was approximately 100 percent, of which 89 percent was the linear ester.

Similar results are obtained in Example 7 at reaction temperatures of 30° C., 60° C., 100° C., and 140° C. At reaction pressures of 5000, 1500, 750, and 2000 p.s.i. analogous results are again obtained.

EXAMPLE 8

A suitably sized autoclave was charged with 90 mmoles of dodecene-1, about 16 grams of methanol, about 24.8 grams of acetone, 1.0 gram of $K_2PtCl_6$ and 2.6 grams of $SnCl_4$. Carbon monoxide was added to a pressure of 2700 p.s.i. The reaction mixture was heated to 90° C. and the pressure was adjusted with CO to 3100 p.s.i. The reaction was continued at this temperature for 1 hour during which a pressure drop of 100 p.s.i. was observed. The reaction mass was then cooled to room temperature and the autoclave was vented. 57.0 grams of liquid product were obtained. Analysis of the product by vapor phase chromatography showed that conversion of olefin was 43 percent. The yield of methyltridecanoates was 100 percent, of which 80 percent was the linear ester.

Use of equivalent amounts of butene-1, hexene-1, eicosene-1, or pentacosene-1 in place of dodecene-1 in Example 8 produces similar yields of the methyl esters of pentanoic acids, heptanoic acids, heneicosanoic acids, and hexacosanoic acids, respectively.

EXAMPLE 9

A suitably sized autoclave was charged with 90 mmoles of docene-1, about 16 grams of methanol, about 24 grams of acetone, 0.68 gram of $K_2PtCl_4$ and 2.6 grams of $SnCl_4$. Carbon monoxide was added to a pressure of 2700 p.s.i. The reaction mixture was heated to 90° C. and the pressure was adjusted with CO to 3000 p.s.i. The reaction was continued at this temperature for 1 hour during which a pressure drop of 160 p.s.i. was observed. The reaction mass was then cooled to room temperature and the autoclave was vented. 54.2 grams of liquid product were obtained. Analysis of the product by vapor phase chromatography showed that conversion of olefin was 44 percent. The yield of methyl tridecanoates was 80 percent, of which 78 percent was the linear ester.

EXAMPLE 10

A suitably sized autoclave was charged with 131 mmoles of 1,7-octadiene, about 16 grams of methanol, about 24 grams of acetone, 1.0 gram of $K_2PtCl_6$ and 2.3 grams of $SnCl_2 \cdot 2H_2O$. Carbon monoxide was added to a pressure of 2700 p.s.i. The reaction mixture was heated to 85° C. and the pressure was adjusted with CO to 3000 p.s.i. The reaction was continued at this temperature for 3 hours during which a pressure drop of 825 p.s.i. was observed. The reaction mass then cooled to room temperature and the autoclave was vented. 61.5 grams of liquid product were obtained. Analysis of the product by vapor phase chromatography showed that conversion of olefin was 100 percent; and that the product contained dimethyl esters of $C_{10}$ saturated dicarboxylic acids and methyl esters of $C_9$ unsaturated monocarboxylic acids. The yield of said diesters was 61 percent, of which 71 percent was the linear diester; and the yield of said methyl esters of unsaturated acid was 32 percent, of which 66 percent was the linear ester.

Thhe following table contains data for another series of examples of the carboxylation process in which a promoter is used. In each case, where the analogous reaction is run without a promoter, the rate of carboxylation is significantly lower. The relationship of the two rates of reaction, that is, with a promoter vs. without a promoter, for this series of examples (as well as for Examples 4–10) is of the same general order as that illustrated by the Examples 1 and 2 or 3.

The tin or germanium salts used as catalysts in the present invention are, in general, soluble in alcohol. The platinum salts may also be soluble in alcohol. Soluble in alcohol means soluble in a lower alkanol such as ethanol, methanol, isopropanol and the like. Salts of tin or germanium and noble metal acids which are not soluble in alcohol but which are soluble in the olefin and/or the promoter can also be used. On the other hand, tin or germanium salts and platinum salts which are not soluble in any component of the reaction system can also be used. In this case, the combination of tin or germanium salts and platinum acids may be dispersed directly in the reaction system using methods known in the art; or the catalyst metal salts and noble metal acids may be used deposited on an inert support.

The process of this invention is properly described above. The examples presented served to illustrate, but are not meant to limit this invented process. It is intended that this invention be limited only within the scope of the following claims.

We claim:

1. A process for preparing carboxylic acid esters which comprises reacting $C_2$–$C_{32}$ olefin, characterized by having
   (A) at least one alpha carbon-to-carbon double bond, and
   (B) a hydrogen on the 2-carbon atom of said α-double bond, with carbon monoxide and a $C_1$–$C_{24}$ alcohol reactant at an olefin:alcohol reactant ratio of 1:1 to 1:10 in the presence of
   (a) from 0.0001 to 0.2 mole of contained platinum metal per mole of alcohol reactant, of a catalyst which is a combination of
      (i) an alcohol soluble salt of a metal selected from tin and germanium, and
      (ii) a platinum salt wherein the molar ratio of said salt (i): said platinum salt (ii) is from 1:1 to 20:1, and
   (b) from 10% to about 70% by weight, based on the total olefin/alcohol reactant, of an alkyl ketone promoter, said ketone having up to 11 carbon atoms and one

group.

TABLE 1

| Olefin (moles) | Alcohol (moles) | Catalyst (parts:parts) [1] | CO pressure (p.s.i.) | Reaction temperature (° C.) | Promoter (weight %) [2] | Major ester product [3] |
|---|---|---|---|---|---|---|
| Decene-1 (1) | n-Butanol (1) | GeCl$_4$:K$_2$PtCl$_4$ (5:1) | 1,500 | 80 | Methyl ethyl ketone (50) | Butyl undecanoate. |
| Pentadecene-1 (1) | tert-Butanol (2) | GeBr$_4$:Na$_2$PtBr$_4$ (20:1) | 6,000 | 85 | Cyclohexanone (40) | Tert-butylhexadecanoate. |
| Dotriacontene-1 (1) | n-Hexanol (1.5) | GeI$_4$:Na$_2$PtI$_6$ (6:1) | 2,500 | 110 | Diisoamyl ketone (10) | n-Hexyl-tritriacontanoate. |
| Hexadecadiene-1,4 (1) | Isopropanol (10) | GeCl$_4$:K$_2$PtI$_4$ (2:1) | 4,500 | 70 | Tetrahydrofuran (60) | Isopropyl heptadecanoate. |
| Nonadecene-1 (1) | 2-ethyl-n-hexanol (8) | SnCl$_2$:Li$_2$PtBr$_6$ (1:1.1) | 2,100 | 120 | Methyl-tert-butyl ketone (70) | 2-ethyl-n-hexyl eicosanoate. |
| Tetracosene-1 (1) | n-Decanol (6.5) | GeCl$_4$:Na$_2$PtCl$_6$ (2.5:1) | 3,600 | 100 | Diethyl ketone (20) | n-Decyl pentacosanoate. |
| Heptadecene-1 (1) | Cyclohexanol (4) | SnCl$_2$:K$_2$PtBr$_4$ (1:1.5) | 750 | 96 | Cyclohexyl methyl ketone (44) | Cyclohexyl octadecanoate. |
| Ethylene (1) | Ethanol (3.5) | SnBr$_2$:Na$_2$PtBr$_6$ (1:0.1) | 3,000 | 150 | 2-ethylhexyl methyl ketone (56) | Ethyl propionate. |
| Octadecene-1 (1) | 2-pentanol (9) | SnSO$_4$:Li$_2$PtI$_6$ (6:1) | 1,000 | 50 | 1,3-dioxane (32) | 1-methyl-n-butyl nonadecanoate. |
| Pentene-1 (1) | 4-nonanol (5) | SnCl$_4$:Na$_2$PtCl$_4$ (3:1) | 10,000 | 62 | Diisobutyl ketone (66) | 1-n-pentyl hexanoate. |

[1] Weight ratio; also either or both catalyst components may be hydrated or non-hydrated.
[2] Based on total reactant charge.
[3] Branched isomers are also produced as illustrated by Equation I above.

The ester products of the present reaction have many uses in the chemical field. For example, the esters may be used as solvents; as plasticizers for resins such as polyvinylchloride, and the like; as chemical intermediates in ester interchange reactions. The esters may also be hydrolyzed to yield acids which are useful as detergent intermediates.

2. The process of claim 1 wherein said alcohol reactant is a $C_1$–$C_{10}$ alkanol.

3. The process of claim 2 wherein said alkanol is a $C_1$–$C_{15}$ monohydroxy primary alkanol.

4. The process of claim 3 wherein said alkanol is methanol.

5. The process of claim 1 wherein the molar ratio of olefin:alcohol reactant is from 1:1 to about 1:6.

6. The process of claim 5 wherein said olefin:alcohol molar ratio is 1:2 to about 1:6.

7. The process of claim 1 wherein the reaction temperature is from about 50° C. to about 275° C. and the reaction pressure is from about 500 to about 10,000 pounds per square inch.

8. The process of claim 7 wherein said reaction temperature is from about 70° C. to about 120° C. and said reaction pressure is from about 750 to 5000 pounds per square inch.

9. The process of claim 8 wherein said olefin:alcohol reactant ratio is 1:1 to about 1:6 and said alcohol reactant is a $C_1$–$C_{10}$ alkanol.

10. The process of claim 9 wherein said alkanol is a $C_1$–$C_5$ monohydroxy alkanol.

11. The process of claim 1 wherein said alcohol soluble salt is a halogen salt of tin or germanium.

12. The process of claim 11 wherein said alcohol soluble salt is a chloride of tin or germanium.

13. The process of claim 11 wherein said platinum salt is a halide of platinum.

14. The process of claim 11 wherein said platinum salt is a sodium or potassium salt of a haloplatinum acid.

15. The process of claim 1 wherein said olefin is a monoolefin.

16. The process of claim 15 wherein said alcohol reactant is a $C_1$–$C_{10}$ alkanol.

17. The process of claim 16 wherein said catalyst is a combination of an alcohol soluble tin or germanium halide and a platinum halide or alkali metal salt of a chloroplatinum acid.

18. The process of claim 17 wherein said alkanol is a $C_1$–$C_5$ monohydroxy alkanol and said alcohol soluble salt is a chloride of tin or germanium.

19. The process of claim 18 wherein said alkanol is methanol.

20. The process of claim 19 wherein said promoter is acetone.

21. The process of claim 8 wherein said olefin is $C_8$–$C_{24}$ olefin, said alcohol reactant is $C_1$–$C_{10}$ monohydroxy alkanol, said olefin:alcohol reactant molar ratio is 1:1 to about 1:6, and said alcohol soluble salt is a halide of germanium or tin.

22. The process of claim 21 wherein said olefin is an $\alpha$-monoolefin.

23. The process of claim 21 wherein said platinum salt is an alkali metal salt of a haloplatinum acid.

24. The process of claim 23 wherein said haloplatinum acid is chloroplatinic acid.

25. The process of claim 24 wherein said platinum salt is $K_2PtCl_6$.

26. The process of claim 21 wherein said alkanol is a $C_1$–$C_5$ alkanol.

27. The process of claim 25 wherein said alkanol is methanol.

28. The process of claim 26 wherein said promoter is acetone.

29. The process of claim 28 wherein said olefin is hexene and said platinum salt is $K_2PtCl_6$.

30. The process of claim 28 wherein said olefin is dodecene and said platinum salt is $K_2PtCl_6$.

References Cited
UNITED STATES PATENTS

| | | | |
|---|---|---|---|
| 2,876,254 | 3/1959 | Jenner et al. | 260—486 |
| 2,916,513 | 12/1959 | Lautenschlager et al. | 260—486 |
| 2,962,525 | 11/1960 | Johnson et al. | 260—486 |

LEWIS GOTTS, Primary Examiner

D. G. RIVERS, Assistant Examiner

U.S. Cl. X.R.

260—408, 410, 410.5, 468 CB, 479 R, 485 R, 486 AC, 497 A

PO-1050
(5/69)

UNITED STATES PATENT OFFICE
CERTIFICATE OF CORRECTION

Patent No. 3,660,439            Dated May 2, 1972

Inventor(s) Raymond A. Schell

It is certified that error appears in the above-identified patent and that said Letters Patent are hereby corrected as shown below:

In Column 7, Table 1, heading "CG pressure sure (p.s.i.)" should be -- CO pressure (p.s.i.) --.

In Column 8, Claim 3, "$C_1-C_{15}$" should be -- $C_1-C_5$ --.

Signed and sealed this 22nd day of August 1972.

(SEAL)
Attest:

EDWARD M. FLETCHER, JR.                    ROBERT GOTTSCHALK
Attesting Officer                                 Commissioner of Patents